US008812912B2

(12) United States Patent
Kangas et al.

(10) Patent No.: US 8,812,912 B2
(45) Date of Patent: *Aug. 19, 2014

(54) DETECTING SYSTEM COMPONENT FAILURES IN A COMPUTING SYSTEM

(71) Applicant: International Business Machines Corporation, Armonk, NY (US)

(72) Inventors: Paul D. Kangas, Raleigh, NC (US); Daniel M. Ranck, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/906,995

(22) Filed: May 31, 2013

(65) Prior Publication Data

US 2013/0268813 A1 Oct. 10, 2013

Related U.S. Application Data

(63) Continuation of application No. 12/949,930, filed on Nov. 19, 2010, now Pat. No. 8,527,817.

(51) Int. Cl.
*G06F 11/30* (2006.01)
(52) U.S. Cl.
USPC .................... 714/44; 714/25; 714/48; 714/57
(58) Field of Classification Search
CPC ................................ G06F 11/30; G06F 11/79
USPC .......................................... 714/25, 44, 48, 57
See application file for complete search history.

(56) References Cited

U.S. PATENT DOCUMENTS

| 4,679,077 | A | 7/1987 | Yuasa et al. |
| 5,469,188 | A | 11/1995 | Krishnamurthy et al. |
| 5,566,339 | A | 10/1996 | Perholtz et al. |
| 5,949,235 | A | 9/1999 | Castleman et al. |
| 6,114,952 | A | 9/2000 | Francesangeli et al. |
| 6,151,383 | A | 11/2000 | Xue et al. |
| 6,172,611 | B1 | 1/2001 | Hussain et al. |
| 6,275,559 | B1 | 8/2001 | Ramani et al. |
| 6,633,663 | B1 | 10/2003 | Slesinger |
| 7,120,559 | B1 | 10/2006 | Williams et al. |
| 7,379,846 | B1 | 5/2008 | Williams et al. |
| 8,059,866 | B2 | 11/2011 | Dutton et al. |

(Continued)

FOREIGN PATENT DOCUMENTS

| JP | 6282786 A | 10/1994 |
| JP | 1118252 A | 4/1999 |
| JP | 2003303746 A | 10/2003 |

OTHER PUBLICATIONS

Office Action, U.S. Appl. No. 12/949,930, Dec. 6, 2012, pp. 1-46.

(Continued)

*Primary Examiner* — Chae Ko
(74) *Attorney, Agent, or Firm* — Brandon C. Kennedy; Katherine S. Brown; Biggers Kennedy Lenart Spraggins LLP

(57) ABSTRACT

Detecting system component failures in a computing system, including: detecting, by an illumination detector, the occurrence of an illumination event in the computing system; determining, by an illumination event identifier, whether the illumination event is associated with a suspected component failure in the computing system; and sending, by a notification system, a failure event notification upon determining that the illumination event is associated with a suspected component failure in the computing system.

20 Claims, 4 Drawing Sheets

(56) References Cited

U.S. PATENT DOCUMENTS

| | | |
|---|---|---|
| 8,131,012 B2 | 3/2012 | Eaton et al. |
| 8,167,430 B2 | 5/2012 | Cobb et al. |
| 8,527,817 B2 | 9/2013 | Kangas et al. |
| 2002/0118210 A1 | 8/2002 | Yuasa et al. |
| 2002/0177970 A1 | 11/2002 | Awtrey et al. |
| 2003/0107654 A1 | 6/2003 | Ohmura |
| 2004/0119005 A1 | 6/2004 | Krohn et al. |
| 2004/0141157 A1 | 7/2004 | Ramachandran et al. |
| 2005/0008245 A1 | 1/2005 | Katougi et al. |
| 2005/0046702 A1 | 3/2005 | Katayama et al. |
| 2006/0020378 A1 | 1/2006 | Salman et al. |
| 2006/0064999 A1 | 3/2006 | Hermerding et al. |
| 2007/0071308 A1 | 3/2007 | Nakatani |
| 2007/0263238 A1 | 11/2007 | Lieberman et al. |
| 2007/0299720 A1 | 12/2007 | Tafoya |
| 2008/0030362 A1 | 2/2008 | Huang et al. |
| 2008/0246862 A1 | 10/2008 | Prakash |
| 2008/0253380 A1 | 10/2008 | Cazares et al. |
| 2008/0264652 A1 | 10/2008 | Baccelli et al. |
| 2009/0146806 A1 | 6/2009 | Jensen et al. |
| 2009/0170467 A1 | 7/2009 | Nowlan et al. |
| 2009/0276762 A1 | 11/2009 | Ponitsch |
| 2010/0265548 A1 | 10/2010 | Yamaguchi et al. |
| 2011/0066895 A1 | 3/2011 | Windell et al. |
| 2011/0078519 A1 | 3/2011 | Yordanov et al. |
| 2011/0161745 A1 | 6/2011 | Rahman et al. |
| 2011/0191635 A1 | 8/2011 | Shao et al. |
| 2011/0240798 A1 | 10/2011 | Gershzohn et al. |
| 2011/0242324 A1 | 10/2011 | Hirose et al. |
| 2012/0013479 A1 | 1/2012 | Chan et al. |
| 2012/0127303 A1 | 5/2012 | Kangas et al. |
| 2012/0131390 A1 | 5/2012 | Kangas et al. |
| 2012/0131393 A1 | 5/2012 | Kangas et al. |

OTHER PUBLICATIONS

Notice of Allowance, U.S. Appl. No. 12/949,930, Apr. 29, 2013, pp. 1-8.

Office Action, U.S. Appl. No. 12/950,208, Feb. 24, 2014, pp. 1-18.

Office Action, U.S. Appl. No. 12/950,157, Mar. 24, 2014, pp. 1-14.

US 8,812,912 B2

DETECTING SYSTEM COMPONENT FAILURES IN A COMPUTING SYSTEM

CROSS-REFERENCE TO RELATED APPLICATION

This application is a continuation application of and claims priority from U.S. patent application Ser. No. 12/949,930, filed on Nov. 19, 2010.

BACKGROUND OF THE INVENTION

1. Field of the Invention

The field of the invention is data processing, or, more specifically, methods, apparatus, and products for detecting system component failures in a computing system.

2. Description of Related Art

Modern computing systems are composed of many parts of varying complexity. In such computing systems, parts can fail, parts can be improperly configured, and the performance of such computing systems can be severely limited as a consequence. Traditional computing system diagnostics with human intervention is costly and pervasive techniques for remote trouble shooting are still very limited.

SUMMARY OF THE INVENTION

Methods, apparatus, and products for detecting system component failures in a computing system, including: detecting, by an illumination detector, the occurrence of an illumination event in the computing system; determining, by an illumination event identifier, whether the illumination event is associated with a suspected component failure in the computing system; and sending, by a notification system, a failure event notification upon determining that the illumination event is associated with a suspected component failure in the computing system.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Example methods, apparatus, and products for detecting system component failures in a computing system in accordance with the present invention are described with reference to the accompanying drawings, beginning with FIG. 1. Detecting system component failures in a computing system in accordance with the present invention is generally implemented with computers, that is, with automated computing machinery. For further explanation, therefore, FIG. 1 sets forth a block diagram of automated computing machinery comprising an example computing system (200) in which system component (204) failures are identified according to embodiments of the present invention.

Figure 1:
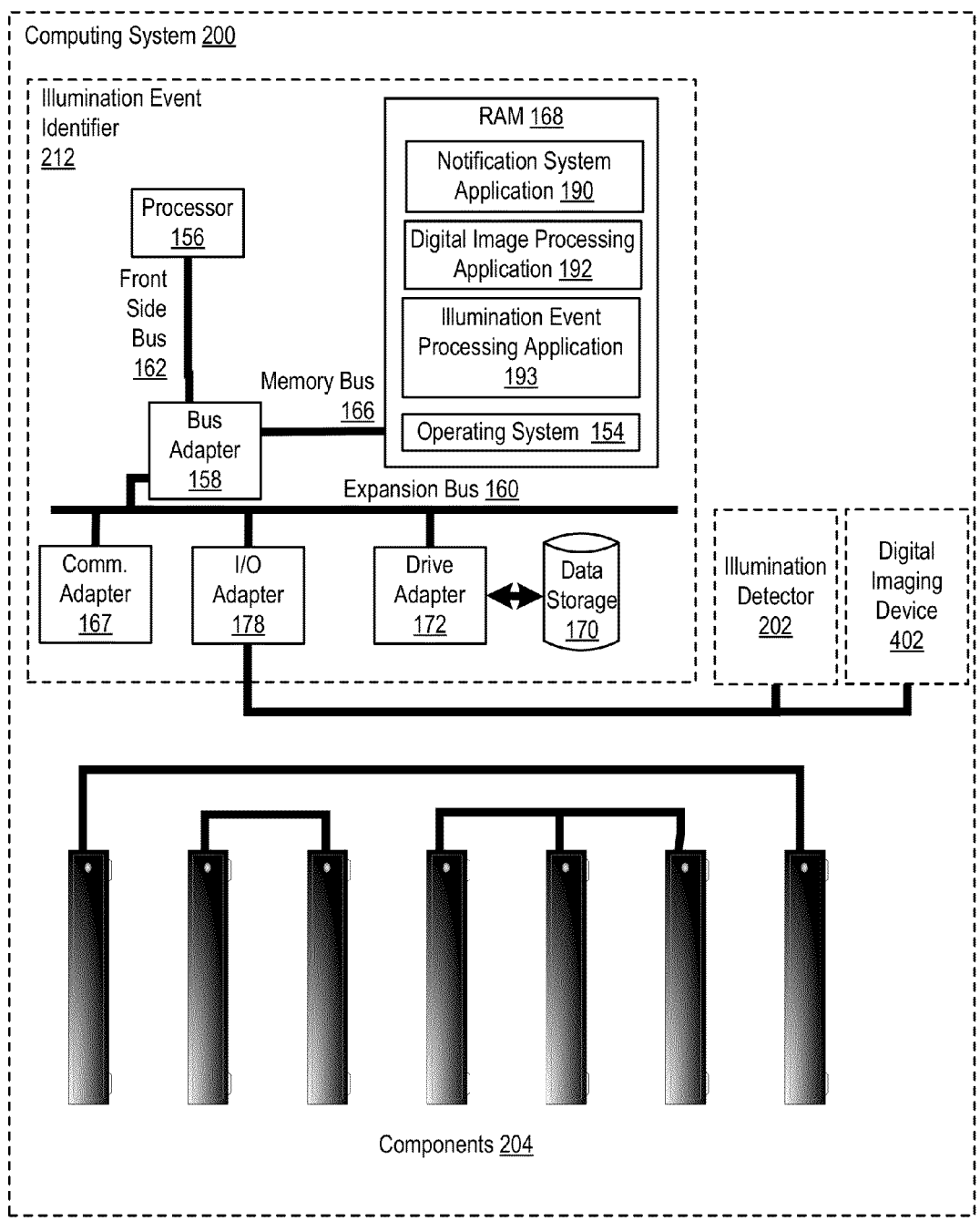
FIG. 1 sets forth a block diagram of automated computing machinery comprising an example computing system in which system component failures are identified according to embodiments of the present invention.

The computing system (200) of FIG. 1 includes one or more components (204). In the example of FIG. 1, a component (204) is any physical entity that is part of the computing system (200). In the example of FIG. 1, a component (204) may be embodied as a server, a port, a cable, a power supply, a transistor, a capacitor, an circuit card with a light-emitting diode ('LED') indicator light, and the like.

The computing system (200) of FIG. 1 also includes a digital imaging device (402). In the example of FIG. 1, the digital imaging device (402) is any device capable of capturing digital images. The digital imaging device (402) may be embodied as a digital camera, digital video camera, or other image sensor. Examples of image sensors include devices that include an integrated charge-coupled device ('CCD'), active-pixel sensor ('APS'), complementary metal-oxide-semiconductor ('CMOS') sensor, an ultraviolet ('UV') sensor, an infrared ('IR') sensor, and so on.

The computing system (200) of FIG. 1 also includes an illumination detector (202). In the example of FIG. 1, the illumination detector (202) is a module of automated computing machinery that detects the introduction of a new light source into the computing system (200). The illumination detector (202) may also detect non-visible light such as, for example, ultraviolet radiation, infrared radiation, and so on. The illumination detector (202) may be embodied, for example, as photosensor, a CCD, a UV sensor, an IR sensor, or other sensor capable of detecting and measuring electromagnetic radiation. New light may be introduced into the computing system (200), for example, when a fire occurs, when an electrical spark occurs, when an LED associated with a component (204) in the computing system (200) is illuminated, and so on.

The computing system (200) of FIG. 1 also includes an illumination event identifier (212). In the example of FIG. 1, the illumination event identifier (212) is a module of automated computing machinery configured to determine whether an illumination event is indicative of a component (204) failure in the computing system (200). The illumination event identifier (212) can determine whether an illumination event is associated with a suspected component (204) failure in the computing system (200), for example, by comparing the measured wavelength of the illumination event with wavelengths of known light sources such as the wavelength of visible light emitted by a fire, the wavelength of visible light emitted by an electrical spark, the wavelength of visible light emitted by a warning light such as an LED, an IR wavelength emitted by a component (204), a UV wavelength emitted by a component (204), and so on.

The illumination event identifier (212) of FIG. 1 includes at least one computer processor (156) or 'CPU' as well as random access memory (168) ('RAM') which is connected through a high speed memory bus (166) and bus adapter (158) to processor (156) and to other components of the illumination event identifier (212). Stored in RAM (168) is a digital imaging processing application (192), a module of computer program instructions for comparing one digital image to another digital image to determine the extent to which the digital images are similar. Also stored in RAM (168) is a notification system application (190), a module of computer program instructions for generating and facilitating the transmission of event failure notifications indicating that a particular component (204) in the computing system (200) is improperly configured or malfunctioning. Also stored in RAM (168) is a illumination event processing application (193), a module of computer program instructions for determining whether an illumination event that has occurred in a computing system (200) is associated with a suspected component (204) failure in the computing system (200). Also stored in RAM (168) is an operating system (154). Operating systems useful in detecting system component failures in a computing system according to embodiments of the present invention include UNIX™, Linux™, Microsoft XP™, AIX™, IBM's i5/OS™, and others as will occur to those of skill in the art. The operating system (154), the digital imaging processing application (192), and the notification system application (190) in the example of FIG. 1 are shown in RAM (168), but many components of such software typically are stored in non-volatile memory also, such as, for example, on a disk drive (170).

The illumination event identifier (212) of FIG. 1 includes disk drive adapter (172) coupled through expansion bus (160) and bus adapter (158) to processor (156) and other components of the illumination event identifier (212). Disk drive adapter (172) connects non-volatile data storage to the illumination event identifier (212) in the form of disk drive (170). Disk drive adapters useful in computers for detecting system component failures in a computing system according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example illumination event identifier (212) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards, mice, and the illumination detector (202). In particular, the illumination event identifier (212) receives input from the illumination detector (202) in the form of, for example, a measured wavelength of detected light or other information describing the nature and properties of an illumination event.

The example illumination event identifier (212) of FIG. 1 includes a communications adapter (167) for data communications with other devices, such as other components (204) and for data communications with a data communications network. In particular, the illumination event identifier (212) is coupled for data communications with data communications networks for the transmission of failure event notifications to a system administrator. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for detecting system component failures in a computing system according to embodiments of the present invention include modems for wired dial-up communications, Ethernet (IEEE 802.3) adapters for wired data communications network communications, and 802.11 adapters for wireless data communications network communications.

In the example of FIG. 1, the illumination event identifier (212) and the illumination detector (202) are depicted as being separate devices. Readers will appreciate that the illumination event identifier (212) and the illumination detector (202) may be embodied, for example, as modules within a single computing device. In the example of FIG. 1, the illumination event identifier (212) is illustrated as including the notification system application (190). Readers will appreciate that the illumination event identifier (212) and the notification system application (190) may reside on separate machines as well. That is, the illumination event identifier (212), illumination detector (202), and notification system application (190) may all reside on a single computing device or on distinct computing devices.

In the example of FIG. 1, system component (204) failures are detected in the computing system (200) by detecting, by the illumination detector (202), the occurrence of an illumination event in the computing system (200); determining, by the illumination event identifier (212), whether the illumination event is associated with a suspected component (204) failure in the computing system (200); and sending, by a notification system application (190), a failure event notification upon determining that the illumination event is associated with a suspected component (204) failure in the computing system (200).

Figure 2:
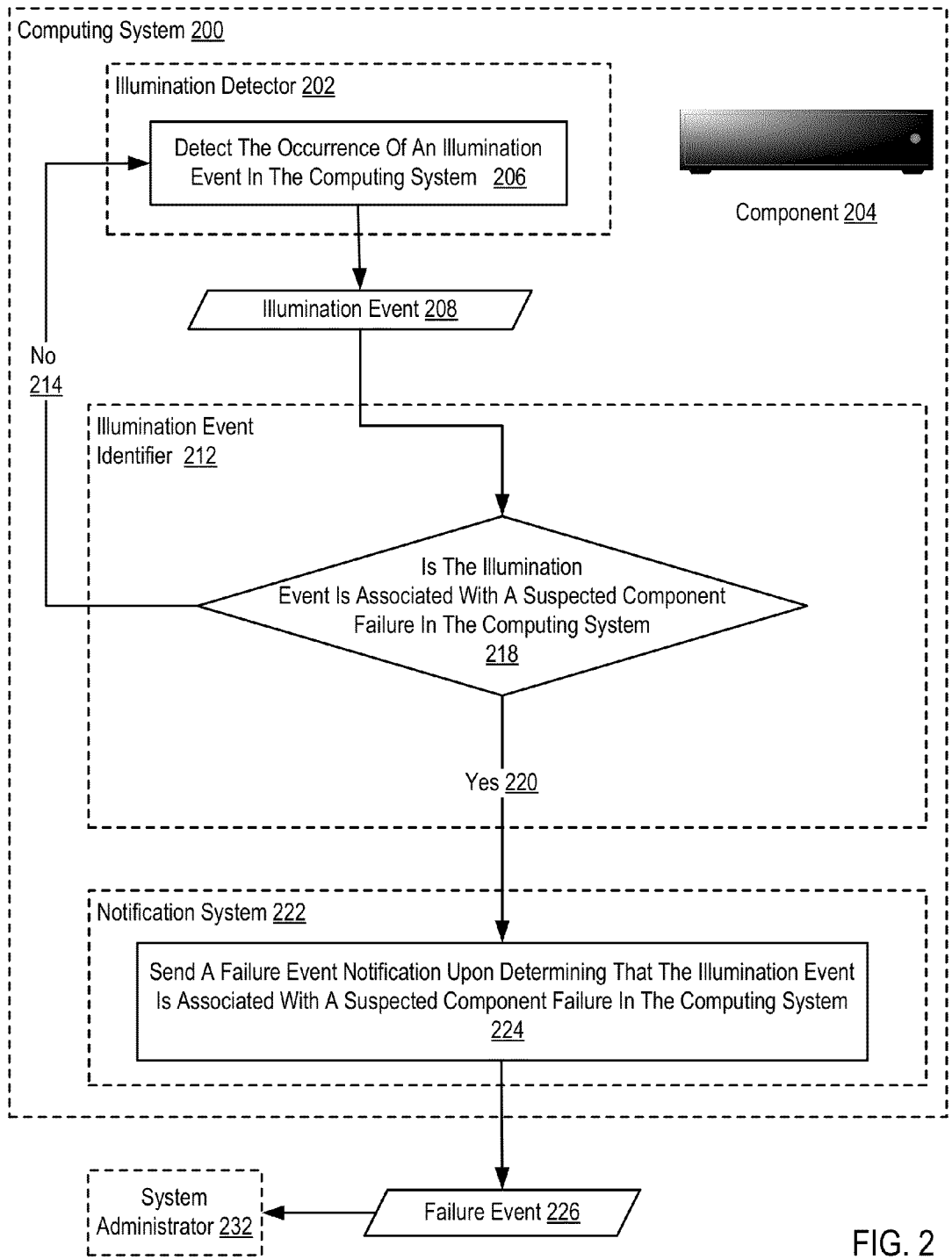
FIG. 2 sets forth a flow chart illustrating an example method for detecting system component failures in a computing system according to embodiments of the present invention.

For further explanation, FIG. 2 sets forth a flow chart illustrating an example method for detecting system component (204) failures in a computing system (200) according to embodiments of the present invention that includes detecting (206), by an illumination detector (202), the occurrence of an illumination event (208) in the computing system (200). An illumination detector (202) is a module of automated computing machinery that detects the introduction of a new light source into the computing system (200). In the example of FIG. 2, the illumination detector (202) may be embodied, for example, as photosensor, charge coupled device ('CCD'), or other sensor capable of detecting and measuring electromagnetic radiation. An illumination event (208) is a light generating event that introduces new light into the computing system (200). In the example of FIG. 2, an illumination event may include, for example, a fire, an electrical spark, the illumination of an LED associated with a component (204) in the computing system (200), and so on.

In the example of FIG. 2, the illumination detector (202) may detect (206) the occurrence of an illumination event (208) in the computing system (200), for example, by determining that a light source in the computing system (200) is emitting light at an unapproved wavelength. For example, a properly functioning computing system (200) may emit no visible light or only emit visible light in a particular range of acceptable wavelengths. In such a computing system (200), if the illumination detector (202) detected visible light that is outside of the range of acceptable wavelengths, the illumination detector (202) could record the measured wavelength of light in the computing system (200) and include the measured wavelength in the illumination event (208) for evaluation by the illumination event identifier (212).

The example of FIG. 2 also includes, determining (218), by an illumination event identifier (212), whether the illumination event (208) is associated with a suspected component (204) failure in the computing system (200). An illumination event identifier (212) is a module of automated computing machinery configured to determine whether an illumination event (208) is indicative of a component (204) failure in the computing system (200). In the example of FIG. 2, the illumination event identifier (212) can determine (218) whether the illumination event (208) is associated with a suspected component (204) failure in the computing system (200), for example, by comparing the measured wavelength of the illumination event (208) with wavelengths of known light sources such as the wavelength of visible light emitted by a fire, the wavelength of visible light emitted by an electrical spark, the wavelength of visible light emitted by a warning light such as an LED, and so on. An illumination event identifier (212) can access wavelengths of known light sources, for example, through the use of an illumination event table or other data source available to the illumination event identifier (212). An illumination event table is illustrated below:

TABLE 1

Illumination Event Table

| Measured Wavelength (nm) | Event Type |
| --- | --- |
| 400-425 | LED Indicator Illuminated |
| 470-490 | Electrical Spark |
| 550-570 | Enclosure Case Open |
| 620-640 | Fire |

In the illustrated illumination event table, there are entries for four different event types: an LED indicator illuminated event indicating that an LED warning light on a particular component (204) has been illuminated; an electrical spark event indicating that some component (204) is producing electrical sparks with the computing system (200); an enclosure case open event indicating that an enclosure case in the computing system (200) is open so that natural light is entering the computing system (200), and a fire event indicating that some component (200) is on fire. Each event type is associated with a particular range of wavelengths measure in nanometers.

In the example of FIG. 2, the illumination event identifier (212) can therefore determine (218) whether the illumination event (208) is associated with a suspected component (204) failure in the computing system (200) by comparing the measured wavelength of the illumination event (208) with the wavelengths contained in the illumination event table. If the measured wavelength of the illumination event (208) is within the wavelength range associated with an event type, the illumination event identifier (212) can determine that an event of the associated event type has occurred within the computing system (200). In the example of FIG. 2, if the illumination event identifier (212) determines that an illumination event (208) is not (214) associated with a suspected component (204) failure, the illumination detector (202) simply continues to monitor the computing system (200). If the illumination event identifier (212) determines that an illumination event (208) is (220) associated with a suspected component (204) failure, however, further action is required.

The example of FIG. 2 includes sending (224), by a notification system (222), a failure event notification (226) upon determining that the illumination event (208) is associated with a suspected component (204) failure in the computing system (200). The notification system (222) of FIG. 2 is automated computing machinery capable of communicating with a notification receipt such as, for example, a system administrator (232), an error log, a notification repository, and so on.

In the example of FIG. 2, sending (224), by a notification system (222), a failure event notification (226) upon determining that the illumination event (208) is associated with a suspected component (204) failure in the computing system (200) may be carried out, for example, by constructing an email message, a short message service ('SMS') message, an instant message, or other form of message over an appropriate data communications network to the system administrator (232). In the example of FIG. 2, the failure event notification (226) may include an identification of the component (204) that is suspect of failing and an event code identifying the illumination event type. For example, the failure event notification (226) may include an identification of a particular power supply in the computing system (200) and an illumination event code indicating that the power supply is generating electrical sparks.

Figure 3:
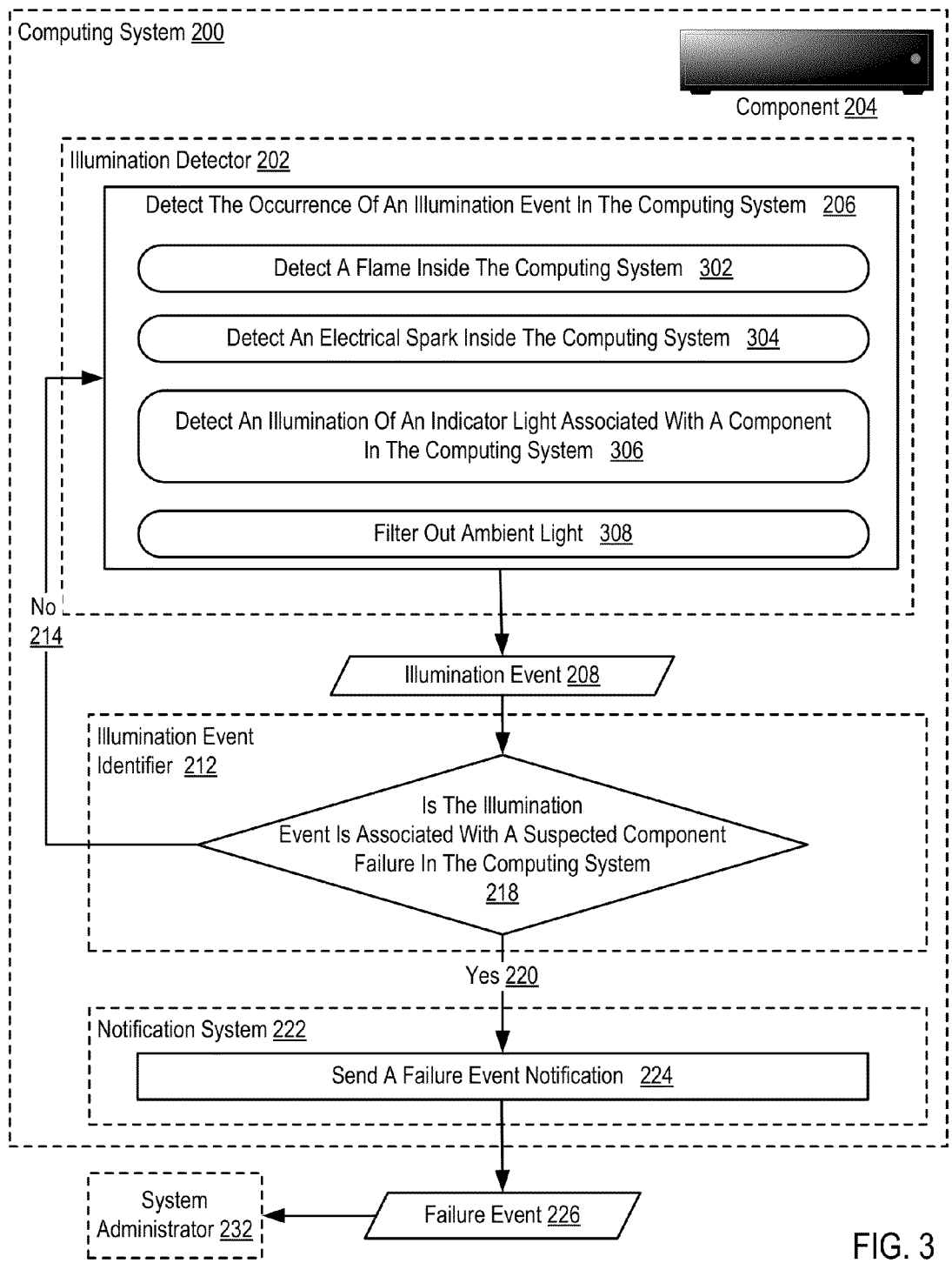
FIG. 3 sets forth a flow chart illustrating an example method for detecting system component failures in a computing system according to embodiments of the present invention.

For further explanation, FIG. 3 sets forth a flow chart illustrating an example method for detecting system component (204) failures in a computing system (200) according to embodiments of the present invention. The example of FIG. 3 is similar to the example of FIG. 2 as it also includes:
  detecting (206), by an illumination detector (202), the occurrence of an illumination event (208) in the computing system (200),
  determining (218), by an illumination event identifier (212), whether the illumination event (208) is associated with a suspected component (2040) failure in the computing system (200), and
  sending (224), by a notification system (222), a failure event notification (226) upon determining that the illumination event (208) is associated with a suspected component (204) failure in the computing system (200).

In the example of FIG. 3, however, detecting (206), by an illumination detector (202), the occurrence of an illumination event (208) in the computing system (200) can include detecting (302) a flame inside the computing system (200). Flames emit visible light that is represented by a particular wavelength. As such, detecting (302) a flame inside the computing system (200) can be carried out, for example, by monitoring the computing system (200) for visible light at the same wavelength as is typically emitted by flames. In such an example, the illumination detector (202) could recorded, in memory accessible by the illumination detector (202), the entire illumination event (208) by recording the flame from start to finish so that useful information about the illumination event (208), such as the length of the illumination event (208), the starting time of the illumination event (208), and the ending time of the illumination event (208) could be determined.

In the example of FIG. 3, detecting (206), by an illumination detector (202), the occurrence of an illumination event (208) in the computing system (200) can alternatively include detecting (304) an electrical spark inside the computing system (200). An electrical spark emits visible light that is represented by a particular wavelength. As such, detecting (304) an electrical spark inside the computing system (200) can be carried out, for example, by monitoring the computing system (200) for visible light at the same wavelength as is typically emitted by an electrical spark.

In the example of FIG. 3, detecting (206), by an illumination detector (202), the occurrence of an illumination event (208) in the computing system (200) can alternatively include detecting (306) an illumination of an indicator light associated with a component (204) inside the computing system (200). An indicator light emits visible light that is represented by a particular wavelength. As such, detecting (304) an illumination of an indicator light associated with a component (204) inside the computing system (200) can be carried out, for example, by monitoring the computing system (200) for visible light at the same wavelength as is typically emitted by the indicator light. Such an indicator light may be attached to the component (204) of interest and may be set to illuminate when the component (200) is malfunctioning. Alternatively, the indicator light may operate in such a way that the indicator light is illuminated when the component (200) is operational, such as an illuminator light that is powered from the same power source that powers the component (200). In such an example, the illuminator light could be monitored in such a way that an alert is generated when the light is not illuminated, for example, when power is not being transferred to the component (204).

In the example of FIG. 3, detecting (206), by an illumination detector (202), the occurrence of an illumination event (208) in the computing system (200) can alternatively include filtering (308) out ambient light. A properly configured computing system (200) may have within it ambient light that is in no way harmful to the computing system (200) and not indicative of component (204) failure. As such, ambient light can be filtered (308) out in the sense that the ambient light is accounted for when monitoring for an illumination event (208). For example, an illumination detector (202) may monitor a the computing system (200) for visible light between a particular wavelength of visible light that would be present when ambient light and a fire, electrical spark, other light source is also present in the computing system (200).

Figure 4:
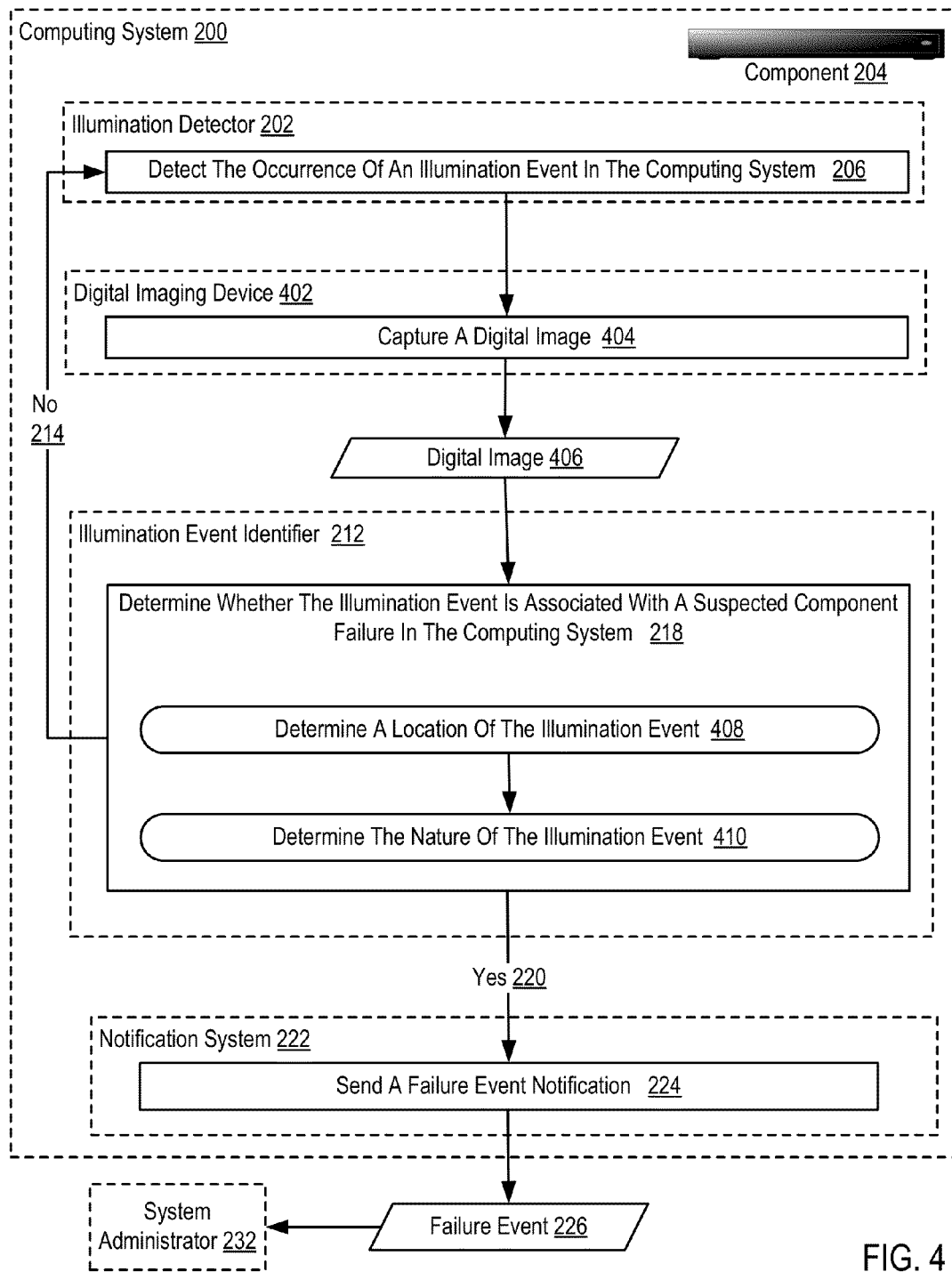
FIG. 4 sets forth a flow chart illustrating an example method for detecting system component failures in a computing system according to embodiments of the present invention.

For further explanation, FIG. 4 sets forth a flow chart illustrating an example method for detecting system component (204) failures in a computing system (200) according to embodiments of the present invention. The example of FIG. 4 is similar to the examples of FIG. 2 and FIG. 3 as it also includes:

- detecting (206), by an illumination detector (202), the occurrence of an illumination event (208) in the computing system (200),
- determining (218), by an illumination event identifier (212), whether the illumination event (208) is associated with a suspected component (2040) failure in the computing system (200), and
- sending (224), by a notification system (222), a failure event notification (226) upon determining that the illumination event (208) is associated with a suspected component (204) failure in the computing system (200).

The example of FIG. 4, however, also includes capturing (404), by a digital imaging device (402), a digital image (406) of the computing system (200). A digital imaging device (402) is any device capable of capturing digital images. In the example of FIG. 4, the digital imaging device (402) may be embodied as a digital camera, digital video camera, or other image sensor. Examples of image sensors include devices that include an integrated CCD, active-pixel sensor ('APS'), or complementary metal-oxide-semiconductor ('CMOS') sensor.

In the example of FIG. 4, capturing (404), by a digital imaging device (402), an image (406) of a component (204) in the computing system (200) can be carried out, for example, by an image sensor that captures and converts an optical image to an electrical signal. In such an embodiment, when light strikes each pixel in the image sensor, the light is held as an electrical charge that is converted to a voltage and subsequently into digital information. The collection of digital information that represents the amount of light that struck each pixel is stored as a digital image (406). Upon capturing (404) the digital image (406), the digital image (406) is sent to or made available to a illumination event identifier (212). In the example of FIG. 4, the digital image (406) may be stored in computer memory that is included as part of the illumination event identifier (212) or stored in computer memory that is accessible by but distinct from the illumination event identifier (212).

In the example of FIG. 4, determining (218) whether the illumination event is associated with a suspected component (204) failure in the computing system (200) includes determining (408), from the digital image (406), a location of the illumination event. In the example of FIG. 4, the digital imaging device (402) is located at a fixed position relative to the computing system (200). As such, the digital imaging device (402) can capture digital images (406) in which various components (204) are located at the same spot of each digital image (406) captured by the digital imaging device (402). For example, if the digital imaging device (402) captures digital images (406) that are 1000 pixels in width and 1000 pixels in height, a particular component (204) will be located at the same position in each digital image (406), where the position in a digital image can be denoted as a set of pixel coordinates indicating which pixels along the X-axis of an image and which pixels along the Y-axis that a particular component (204) resides. As such, the location of the illumination event can be determined (408), for example, by scanning a digital image (406) to determine if a particular set of pixels in the digital image (406) include digital imagery associated with a particular illumination event.

Consider an example in which the digital imaging device (402) is prompted to capture a digital image (406) of a computing system (200) in response to an illumination event wherein a purple warning light associated with a power supply in the computing system (406) is illuminated. Because a digital image (406) that included an illuminated purple warning light would have a particular set of properties, the digital image (406) can be searched for the set of properties that would indicate that an illuminated purple warning light was captured in the digital image (406). For example, a digital image (406) that included an illuminated purple warning light would include various pixels having RGB color levels that produce a purple image. In view of the fact that the location of a particular component (204), such as the power supply that the purple warning light is associated with, within the digital image (406) is known, the portion of the digital image (406) that includes the power supply can be searched for pixels that have RGB color levels that produce a purple image. If pixels that have RGB color levels that produce a purple image are found at the location in the digital image (406) where the power supply would reside, it can be determined that the warning light for the power supply has been illuminated, thereby indicating that the power supply has encountered some sort of issue.

In the example of FIG. 4, determining (218) whether the illumination event is associated with a suspected component (204) failure in the computing system (200) also includes determining (410) the nature of the illumination event. In the example of FIG. 4, determining (410) the nature of the illumination event can be carried out by inspecting the digital image (406). For example, a fire would be represented in a digital image (406) by different RGB color levels than would an illuminated green warning light. As such, the nature of an illumination event can be determined (410) by inspecting the digital image (406) and determining (410) what illumination event type based on the image properties that an event type would exhibit if captured in a digital image (406). For example, an event type properties table as follows could be used:

TABLE 2

Event Type Properties

| RGB code in a digital image | Event Type |
|---|---|
| 228b22 | LED Indicator 1 Illuminated |
| 9400d3 | LED Indicator 2 Illuminated |
| 0000cd | Electrical Spark |
| ffa500 | Fire |

In the illustrated event type properties table, there are entries for four different event types: a first LED indicator light is illuminated, a second LED indicator light is illuminated, an electrical spark occurs, and a fire occurs. By scanning a digital image (406) for pixels that contain RGB color levels identified by the RGB hex code associated with each event type, the nature of an illumination event can be determined (410) based on the representation of the illumination event in the digital image. As such, information regarding the event type and information identifying the component (204) whose failure is suspected can be included in the failure event notification (226) that is sent (224) the system administrator (232) or other administrative entity.

Although the illumination events are described above as being instantaneous events, readers will appreciate that an illumination event may also occur over a period of time. For example, a sequence of flashes from an LED indicator light associated with a component may be a single illumination event as the series of flashes may represent a code that is useful in servicing a component. As such, embodiments of the present invention allow for diagnosing system warnings or failures without human intervention. Likewise, a fire, which begins at a certain time and is extinguished at a later time, may be a single illumination event from which an administrator can determine how quickly a flame spreads, how long a fire lasts, and so on.

Example embodiments of the present invention are described largely in the context of a fully functional computer system for detecting system component failures in a computing system. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of detecting system component failures in a computing system, the method comprising:
   detecting, by an illumination detector, the occurrence of an illumination event in the computing system;
   determining, by an illumination event identifier, whether the illumination event is associated with a suspected component failure in the computing system.

2. The method of claim 1 wherein detecting the occurrence of an illumination event in the computing system includes detecting a flame inside the computing system.

3. The method of claim 1 wherein detecting the occurrence of an illumination event in the computing system includes detecting an electrical spark inside the computing system.

4. The method of claim 1 wherein detecting the occurrence of an illumination event in the computing system includes detecting an illumination of an indicator light associated with a component in the computing system.

5. The method of claim 1 wherein detecting the occurrence of an illumination event in the computing system includes filtering out ambient light.

6. The method of claim 1 further comprising capturing, by a digital imaging device, a digital image of the computing system.

7. The method of claim 6 wherein determining whether the illumination event is associated with a suspected component failure in the computing system further comprises:
   determining, from the digital image, a location of the illumination event; and
   determining the nature of the illumination event.

8. Apparatus for detecting system component failures in a computing system, the apparatus comprising a computer processor, a computer memory operatively coupled to the computer processor, the computer memory having disposed within it computer program instructions that, when executed by the computer processor, cause the apparatus to carry out the steps of:
   detecting, by an illumination detector, the occurrence of an illumination event in the computing system;
   determining, by an illumination event identifier, whether the illumination event is associated with a suspected component failure in the computing system.

9. The apparatus of claim 8 wherein detecting the occurrence of an illumination event in the computing system includes detecting a flame inside the computing system.

10. The apparatus of claim 8 wherein detecting the occurrence of an illumination event in the computing system includes detecting an electrical spark inside the computing system.

11. The apparatus of claim 8 wherein detecting the occurrence of an illumination event in the computing system includes detecting an illumination of an indicator light associated with a component in the computing system.

12. The apparatus of claim 8 wherein detecting the occurrence of an illumination event in the computing system includes filtering out ambient light.

13. The apparatus of claim 8 further comprising computer program instructions that, when executed by the computer processor, cause the apparatus to carry out the step of capturing, by a digital imaging device, a digital image of the computing system.

14. The apparatus of claim 13 wherein determining whether the illumination event is associated with a suspected component failure in the computing system further comprises:
   determining, from the digital image, a location of the illumination event; and
   determining the nature of the illumination event.

15. A computer program product for detecting system component failures in a computing system, the computer program product disposed upon a computer readable storage medium, wherein the computer readable storage medium is not a signal, the computer program product comprising computer program instructions that, when executed, cause a computer to carry out the steps of:
   determining, by an illumination event identifier, whether the illumination event is associated with a suspected component failure in the computing system; and
   sending, by a notification system, a failure event notification upon determining that the illumination event is associated with a suspected component failure in the computing system.

16. The computer program product of claim 15 further comprising computer program instructions that, when executed, cause the computer to carry out the step of detecting, by an illumination detector, the occurrence of an illumination event in the computing system, including detecting a flame inside the computing system.

17. The computer program product of claim 15 further comprising computer program instructions that, when executed, cause the computer to carry out the step of detecting, by an illumination detector, the occurrence of an illumination event in the computing system, including detecting an illumination of an indicator light associated with a component in the computing system.

18. The computer program product of claim 15 further comprising computer program instructions that, when executed, cause the computer to carry out the step of detecting, by an illumination detector, the occurrence of an illumination event in the computing system, including filtering out ambient light.

19. The computer program product of claim 15 further comprising computer program instructions that, when executed, cause the computer to carry out the step of capturing, by a digital imaging device, a digital image of the computing system.

20. The computer program product of claim 19 wherein determining whether the illumination event is associated with a suspected component failure in the computing system further comprises:
   determining, from the digital image, a location of the illumination event; and
   determining the nature of the illumination event.

* * * * *